No. 896,666. PATENTED AUG. 18, 1908.
A. B. ROSSON.
HAME HOOK.
APPLICATION FILED OCT. 8, 1907.

Inventor
A. B. Rosson.

Witnesses

By
R. A. B. Lacey, Attorneys

UNITED STATES PATENT OFFICE.

ALPINE B. ROSSON, OF ERICK, OKLAHOMA, ASSIGNOR OF ONE-HALF TO HARDY L. CATHEY, OF ERICK, OKLAHOMA.

HAME-HOOK.

No. 896,666.  Specification of Letters Patent.  Patented Aug. 18, 1908.

Application filed October 8, 1907. Serial No. 396,448.

*To all whom it may concern:*

Be it known that I, ALPINE B. ROSSON, citizen of the United States, residing at Erick, in the county of Greer and State of Oklahoma, have invented certain new and useful Improvements in Hame-Hooks, of which the following is a specification.

The object of this invention is an improved hame hook which may be used on either right or left hame and which is so constructed as to effectually prevent the chain or tug from becoming accidentally disengaged from the hook when it has been secured thereon, and also to eliminate the possibility of the hook becoming accidentally engaged with the hame hook of another animal that is liable to occur with the ordinary form of open hook usually employed.

With these and other objects in view the invention consists in certain constructions and arrangements of parts that I shall hereinafter fully describe and then point out the novel features of in the appended claims.

Figure 1:
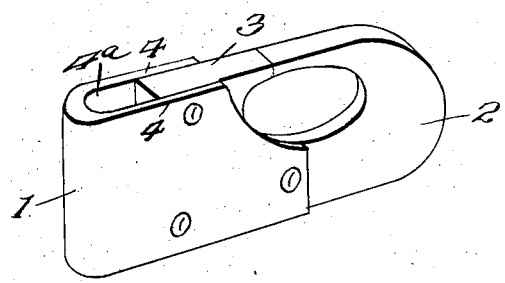
Figure 2:
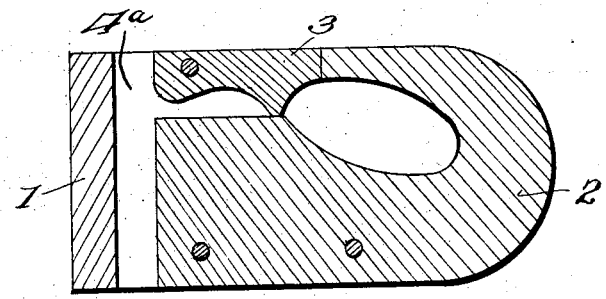
Figure 3:
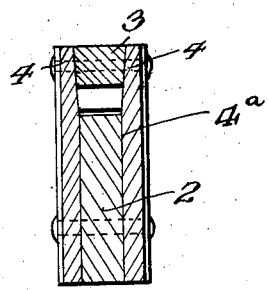

For a full understanding of the invention, reference is to be had to the following description and accompanying drawings, in which:

Figure 1 is a perspective view of my improved hame-hook. Fig. 2 is a longitudinal sectional view thereof, and Fig. 3 is a transverse section.

Corresponding and like parts are referred to in the following description and indicated in all the views of the drawings by the same reference characters.

This improved hame hook comprises a body portion 1, a hook portion 2 and a latch 3.

The body portion 1 is preferably formed from an integral sheet of metal or other suitable material, doubled upon itself at a point intermediate of its ends to form the spaced members 4 and a socket 4$^a$. The hook portion 2 fits between the members 4 as shown and is rigidly secured in the socket 4$^a$ by rivets or other fastening means.

The latch 3 is pivotally secured in the socket 4$^a$ above the hook portion 2 by means of a rivet or the like passing through the members 4 and one end of the latch, said latch tapering downwardly in cross section, as shown, so as to fit with a wedge action between the members 4 which at this part are preferably correspondingly tapered. This latch may be readily raised when it is desired to engage the trace with the hook 2, the pivot pin of said latch being loose enough to allow the spaced members 4 to yield sufficiently to permit the end of the latch to move downwardly in the socket 4$^a$ to effect the movement of the free end of latch, and thus open the hook. The spaced members 4 are arranged to exert a tension to clamp the latch in either open or closed or any intermediate position, and after the latch has been wedged between the opposing walls of the members 4, it is thus obviously prevented from working out of position, which would admit of the accidental detachment of the trace.

Having thus described the invention, what I claim is:

1. A hame-hook, comprising a body portion provided with a socket, a hook secured in said socket, and a latch tapering in cross-section and movably mounted in said socket and adapted to wedge therein against the hook as and for the purpose set forth.

2. A hame-hook, comprising a body portion embodying spaced members forming a socket, a hook secured between said members, and a tapering latch pivotally mounted between said members and adapted to wedge in and between the latter against the hook.

In testimony whereof I affix my signature in presence of two witnesses.

ALPINE B. ROSSON. [L. S.]

Witnesses:
H. C. GARRETT,
JAMES ROY HUTH.